US012780018B1

(12) United States Patent
Passmore et al.

(10) Patent No.: US 12,780,018 B1
(45) Date of Patent: Nov. 3, 2026

(54) DAMAGE AND HAZARD PREVENTION DEVICE AND METHOD FOR PREVENTING DAMAGE AND SAFETY HAZARDS RELATED TO ELECTRIC VEHICLE CHARGING

(71) Applicant: EVERCHARGE, INC., San Francisco, CA (US)

(72) Inventors: John Loren Passmore, Berkeley, CA (US); Jason Appelbaum, Oakland, CA (US)

(73) Assignee: Everchange, Inc., San Francisco, CA (US)

( * ) Notice: Subject to any disclaimer, the term of this patent is extended or adjusted under 35 U.S.C. 154(b) by 887 days.

(21) Appl. No.: 18/126,196

(22) Filed: Mar. 24, 2023

Related U.S. Application Data

(60) Provisional application No. 63/324,047, filed on Mar. 26, 2022.

(51) Int. Cl.

| | |
|---|---|
| ***B60L 53/16*** | (2019.01) |
| ***B60L 53/66*** | (2019.01) |
| ***H01R 13/635*** | (2006.01) |
| ***H02J 7/70*** | (2026.01) |
| *B60L 53/18* | (2019.01) |

(Continued)

(52) U.S. Cl.
CPC ............... *B60L 53/16* (2019.02); *B60L 53/66* (2019.02); *H01R 13/635* (2013.01); *H02J 7/70* (2026.01); *B60L 53/18* (2019.02); *B60L 53/305* (2019.02); *B60L 53/35* (2019.02); *B67D 2007/0421* (2013.01); *B67D 7/3218* (2013.01); *B67D 7/42* (2013.01); *E05B 81/16* (2013.01); *E05B 81/20* (2013.01); *H01R 13/62* (2013.01); *H01R 13/627* (2013.01); *H01R 13/6271* (2013.01); *H01R 13/633* (2013.01); *H01R 13/639* (2013.01);
(Continued)

(58) Field of Classification Search
CPC ....... B60L 53/66; B60L 53/16; H01R 13/635; H02J 7/70
USPC ........................................................... 320/109
See application file for complete search history.

(56) References Cited

U.S. PATENT DOCUMENTS 5,344,331 A * 9/1994 Hoffman .............. H01R 13/641 439/138
6,554,629 B2 * 4/2003 Koch .................. H01R 13/701 200/51.09

(Continued)

*Primary Examiner* — John T Trischler
(74) *Attorney, Agent, or Firm* — Renaissance IP Law Group, LLP; David A. Crowther

(57) ABSTRACT

A damage and hazard prevention device and method for preventing damage and safety hazards related to electric vehicle charging are disclosed. An electric vehicle charging handle includes a port to deliver a charge to an electric vehicle, and a port to communicate a charging signal to the electric vehicle. The charging handle includes a connector latch assembly to temporarily affix the charging handle to the electric vehicle, and an ejection element to automatically and mechanically push the charging handle away from the electric vehicle. A digital logic section transmits an electronic signal via an electric signal line to cause the ejection element to push the charging handle away from the electric vehicle. A sensor detects at least one of i) a mechanical force applied to the charging handle or ii) movement of the charging handle. The digital logic section triggers an ejection of the ejection element responsive to the sensor's detections.

20 Claims, 6 Drawing Sheets

(51) Int. Cl.

| | |
|---|---|
| *B60L 53/30* | (2019.01) |
| *B60L 53/35* | (2019.01) |
| *B67D 7/04* | (2010.01) |
| *B67D 7/32* | (2010.01) |
| *B67D 7/42* | (2010.01) |
| *E05B 81/16* | (2014.01) |
| *E05B 81/20* | (2014.01) |
| *H01R 13/62* | (2006.01) |
| *H01R 13/627* | (2006.01) |
| *H01R 13/633* | (2006.01) |
| *H01R 13/639* | (2006.01) |

(52) U.S. Cl.

CPC ....... *H01R 2201/26* (2013.01); *Y02T 10/7072* (2013.01); *Y02T 90/14* (2013.01)

(56) References Cited

U.S. PATENT DOCUMENTS 8,025,526 B1 * 9/2011 Tormey .............. H01R 13/6397 439/372
8,206,184 B2 * 6/2012 Kwasny .................. B60L 53/16 439/923
8,562,365 B2 * 10/2013 Sebald .................... B60L 53/16 439/353
8,568,155 B2 * 10/2013 Sebald ................... H01R 24/28 439/304
8,602,804 B2 * 12/2013 Kurumizawa .......... B60L 50/16 439/304
8,708,728 B2 * 4/2014 Hirashita ................ B60L 53/16 439/304
8,956,168 B2 * 2/2015 Al-Anzi ............... H01R 31/065 439/159
9,130,296 B2 * 9/2015 Huang ................. H01R 13/635
9,178,313 B2 * 11/2015 Nakajima ............... B60L 53/16
9,216,656 B2 * 12/2015 Nakajima .......... H01R 13/6397
9,227,519 B2 * 1/2016 Heuer ..................... B60L 53/18
9,227,520 B2 * 1/2016 Kimura .............. H01R 13/6275
9,337,580 B2 * 5/2016 Temmesfeld ......... B60L 3/0061
9,365,116 B2 * 6/2016 Staley ..................... B60L 1/003
9,573,478 B2 * 2/2017 Jefferies .................. B60L 53/66
9,688,156 B2 * 6/2017 Heuer ..................... B60L 53/18
10,183,586 B1 * 1/2019 Appelbaum .............. B60L 1/00
10,259,330 B2 * 4/2019 Eisner ..................... B60L 53/68
10,399,445 B2 * 9/2019 Yellambalase .......... B60L 53/16
10,446,990 B2 * 10/2019 Dykas ................ H01R 13/7038
10,518,650 B2 * 12/2019 Heuer ..................... B60L 53/18
10,604,019 B2 * 3/2020 Heuer ..................... B60L 53/18
10,811,827 B1 * 10/2020 Dykas ................ H01R 13/7038
10,910,777 B2 * 2/2021 Konradt ............... H01R 13/701
10,938,225 B2 * 3/2021 Dudar .................... B60K 6/445
10,967,738 B1 * 4/2021 Appelbaum .............. B60L 1/00
11,046,186 B1 * 6/2021 Appelbaum .............. B60L 1/00
11,139,614 B2 * 10/2021 Alobaidan ........... H01R 13/635
11,285,826 B2 * 3/2022 Richardson ............. B60L 53/16
11,292,354 B2 * 4/2022 Heuer ..................... B60L 53/18
11,318,857 B2 * 5/2022 Westfall .................. B60L 53/35
11,623,538 B1 * 4/2023 Vega ....................... B60L 53/35 439/159
11,735,932 B2 * 8/2023 Wiegman ................ H02J 7/663 320/109
11,787,299 B2 * 10/2023 Vega ....................... B60L 53/16 439/160
11,807,105 B1 * 11/2023 Appelbaum .............. B60L 1/00
11,827,114 B2 * 11/2023 Yu ........................... B60L 53/16
11,881,659 B2 * 1/2024 Wiegman .............. B60L 3/0046
11,884,170 B1 * 1/2024 Vega ...................... H01R 31/06
11,904,715 B2 * 2/2024 Erikson ................... B60L 53/16
11,919,410 B2 * 3/2024 Galland .................. B60L 53/16
11,981,224 B2 * 5/2024 Westfall .................. B60L 53/35
12,128,786 B2 * 10/2024 Appelbaum ............ B60L 53/16
12,172,542 B2 * 12/2024 Dow ...................... G06Q 50/06
12,233,727 B2 * 2/2025 Garcia-Ferre ...... H01R 13/6683
12,240,344 B2 * 3/2025 Huang .................... B60L 53/18
12,275,308 B1 * 4/2025 Appelbaum .............. B60L 1/00
12,280,682 B2 * 4/2025 Vega .................... H01R 13/635
2002/0045371 A1 * 4/2002 Koch ................... H01R 13/622 439/188
2004/0185695 A1 * 9/2004 Takezawa ........... G06K 7/0021 439/159
2012/0003861 A1 * 1/2012 Kwasny .................. B60L 53/18 439/474
2012/0112697 A1 * 5/2012 Heuer ..................... B60L 53/18 320/109
2012/0135626 A1 * 5/2012 Tormey ................. B60L 53/305 320/109
2012/0171887 A1 * 7/2012 Sebald .................... B60L 53/16 29/858
2012/0171900 A1 * 7/2012 Sebald ............... H01R 13/5227 29/874
2012/0238121 A1 * 9/2012 Kurumizawa .......... B60L 53/16 439/299
2012/0238122 A1 * 9/2012 Hirashita ................ B60L 53/16 439/304
2013/0193923 A1 * 8/2013 Kimura ............. H01R 13/6275 320/109
2014/0021915 A1 * 1/2014 Staley ..................... B60L 1/003 439/153
2014/0256172 A1 * 9/2014 Kakizaki ................ B60L 53/16 439/350
2014/0273567 A1 * 9/2014 Huang ................. H01R 25/003 439/157
2014/0300320 A1 * 10/2014 Nakajima ............ B60L 3/0023 320/109
2014/0342590 A1 * 11/2014 Al-Anzi ............... H01R 13/635 439/159
2015/0037994 A1 * 2/2015 Nakajima ............ H01R 13/631 439/304
2015/0108947 A1 * 4/2015 Heuer ..................... B60L 53/18 320/109
2015/0165917 A1 * 6/2015 Robers .................... B60L 53/00 320/109
2015/0295355 A1 * 10/2015 Temmesfeld ............. B60L 3/04 439/304
2016/0137082 A1 * 5/2016 Jefferies .................. B60L 53/16 320/109
2017/0126033 A1 * 5/2017 Dudar .................... B60K 6/445
2017/0232857 A1 * 8/2017 Heuer ..................... B60L 53/18 320/109
2017/0232858 A1 * 8/2017 Heuer ..................... B60L 53/18 320/109
2017/0274786 A1 * 9/2017 Eisner ..................... B60L 53/68
2018/0109048 A1 * 4/2018 Dykas ..................... B60L 53/30
2018/0175563 A1 * 6/2018 Konradt .................. B60L 53/16
2018/0201145 A1 * 7/2018 Yellambalase .......... B60L 53/60
2019/0047426 A1 * 2/2019 Effenberger .......... B60L 53/665
2019/0181587 A1 * 6/2019 Richardson ............. B60L 53/16
2019/0277067 A1 * 9/2019 Sureshkumar .......... B60L 53/60
2020/0122592 A1 * 4/2020 Heuer ..................... B60L 53/18
2020/0412053 A1 * 12/2020 Alobaidan ........... H01R 13/635
2021/0129696 A1 * 5/2021 Westfall .................. B60L 53/35
2022/0097551 A1 * 3/2022 Dow ....................... B60L 53/68
2022/0144107 A1 * 5/2022 Erikson ................... B60L 53/16
2022/0203850 A1 * 6/2022 Galland .................. B60L 53/16
2022/0250495 A1 * 8/2022 Westfall .................. B60L 53/35
2022/0266712 A1 * 8/2022 Appelbaum ............ B60L 53/16
2022/0289051 A1 * 9/2022 Huang .................... B60L 53/18
2022/0297554 A1 * 9/2022 Garcia-Ferre ........... B60L 53/62
2022/0324341 A1 * 10/2022 Yu ........................... B60L 53/16
2023/0060928 A1 * 3/2023 Wiegman .............. B60L 3/0046
2023/0107646 A1 * 4/2023 Vega ....................... B60L 53/35 439/159
2023/0138387 A1 * 5/2023 Wiegman ................ H02J 7/663 320/109
2023/0158902 A1 * 5/2023 Vega ....................... B60L 53/16 439/352
2023/0158903 A1 * 5/2023 Vega ....................... B60L 53/16 439/160
2023/0339340 A1 * 10/2023 Garth ................... H01R 13/639
2024/0072496 A1 * 2/2024 Nugent, Jr. ........ H01R 13/7132
2024/0253499 A1 * 8/2024 Cole ....................... B60L 53/30

(56) References Cited

U.S. PATENT DOCUMENTS

| | | | | |
|---|---|---|---|---|
| 2024/0317099 | A1* | 9/2024 | Wang | B60L 53/18 |
| 2025/0010754 | A1* | 1/2025 | Appelbaum | B60L 53/16 |
| 2025/0042290 | A1* | 2/2025 | Raguse | B60L 53/65 |
| 2025/0276591 | A1* | 9/2025 | Shum | B60L 53/16 |
| 2025/0282237 | A1* | 9/2025 | Vega | B60L 53/30 |
| 2025/0381860 | A1* | 12/2025 | Vega | B60L 53/16 |

* cited by examiner

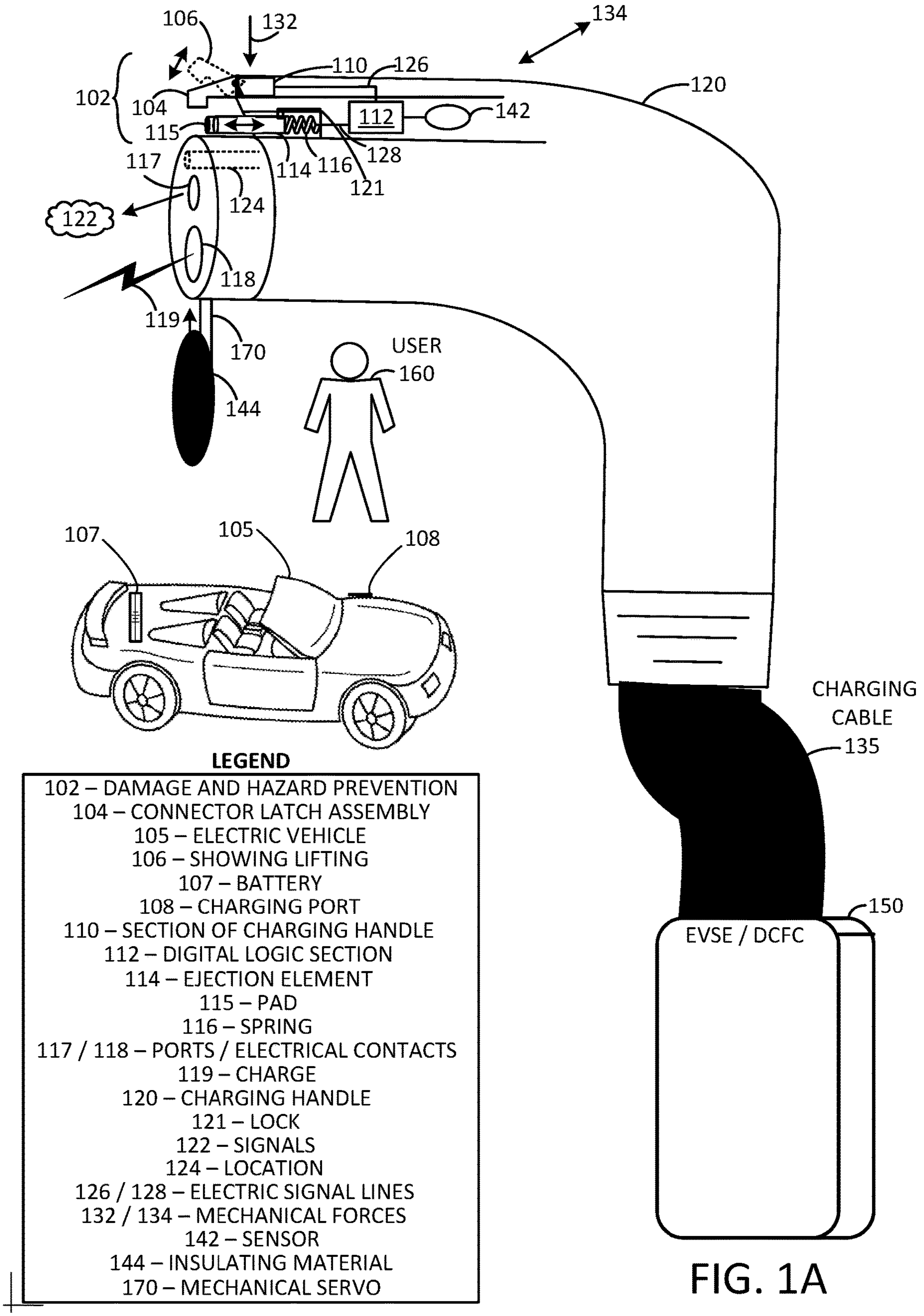

LEGEND

| |
|---|
| 102 – DAMAGE AND HAZARD PREVENTION |
| 104 – CONNECTOR LATCH ASSEMBLY |
| 105 – ELECTRIC VEHICLE |
| 106 – SHOWING LIFTING |
| 107 – BATTERY |
| 108 – CHARGING PORT |
| 110 – SECTION OF CHARGING HANDLE |
| 112 – DIGITAL LOGIC SECTION |
| 114 – EJECTION ELEMENT |
| 115 – PAD |
| 116 – SPRING |
| 117 / 118 – PORTS / ELECTRICAL CONTACTS |
| 119 – CHARGE |
| 120 – CHARGING HANDLE |
| 121 – LOCK |
| 122 – SIGNALS |
| 124 – LOCATION |
| 126 / 128 – ELECTRIC SIGNAL LINES |
| 132 / 134 – MECHANICAL FORCES |
| 142 – SENSOR |
| 144 – INSULATING MATERIAL |
| 170 – MECHANICAL SERVO |

FIG. 1A

DAMAGE AND HAZARD PREVENTION DEVICE AND METHOD FOR PREVENTING DAMAGE AND SAFETY HAZARDS RELATED TO ELECTRIC VEHICLE CHARGING

RELATED APPLICATION DATA

This application claims the benefit of U.S. Provisional Patent Application No. 63/324,047, filed on Mar. 26, 2022, the contents of which are hereby incorporated by reference.

FIELD

This disclosure relates to electric vehicle charging, and, more particularly, to a damage and hazard prevention device and method for preventing damage and safety hazards related to electric vehicle charging.

BACKGROUND

The adoption of electric vehicles, plug-in hybrid electric vehicles, and the like, continues at a rapid pace. As the deployment of electric vehicles increases, the charging infrastructure must be adapted to meet demand. The process of charging an electric vehicle can in some cases cause damage to an electric vehicle service equipment (EVSE) unit, a direct current (DC) fast charger (DCFC), charging handles, and/or other charging equipment. For example, a user may pull a charging cable out in a manner that damages the electric vehicle charging equipment and/or the electric vehicle itself. In addition, the process of charging an electric vehicle can cause safety hazards, such as electrocution.

Accordingly, a need remains for improved devices, methods, and systems for preventing damage and reducing safety hazards related to electric vehicle charging. Embodiments of the invention address these and other limitations in the prior art.

BRIEF DESCRIPTION OF THE DRAWINGS

FIG. 1A illustrates an example diagram of an electric vehicle charging handle including a damage and hazard prevention device in accordance with various embodiments of the present invention.

Figure 1B:
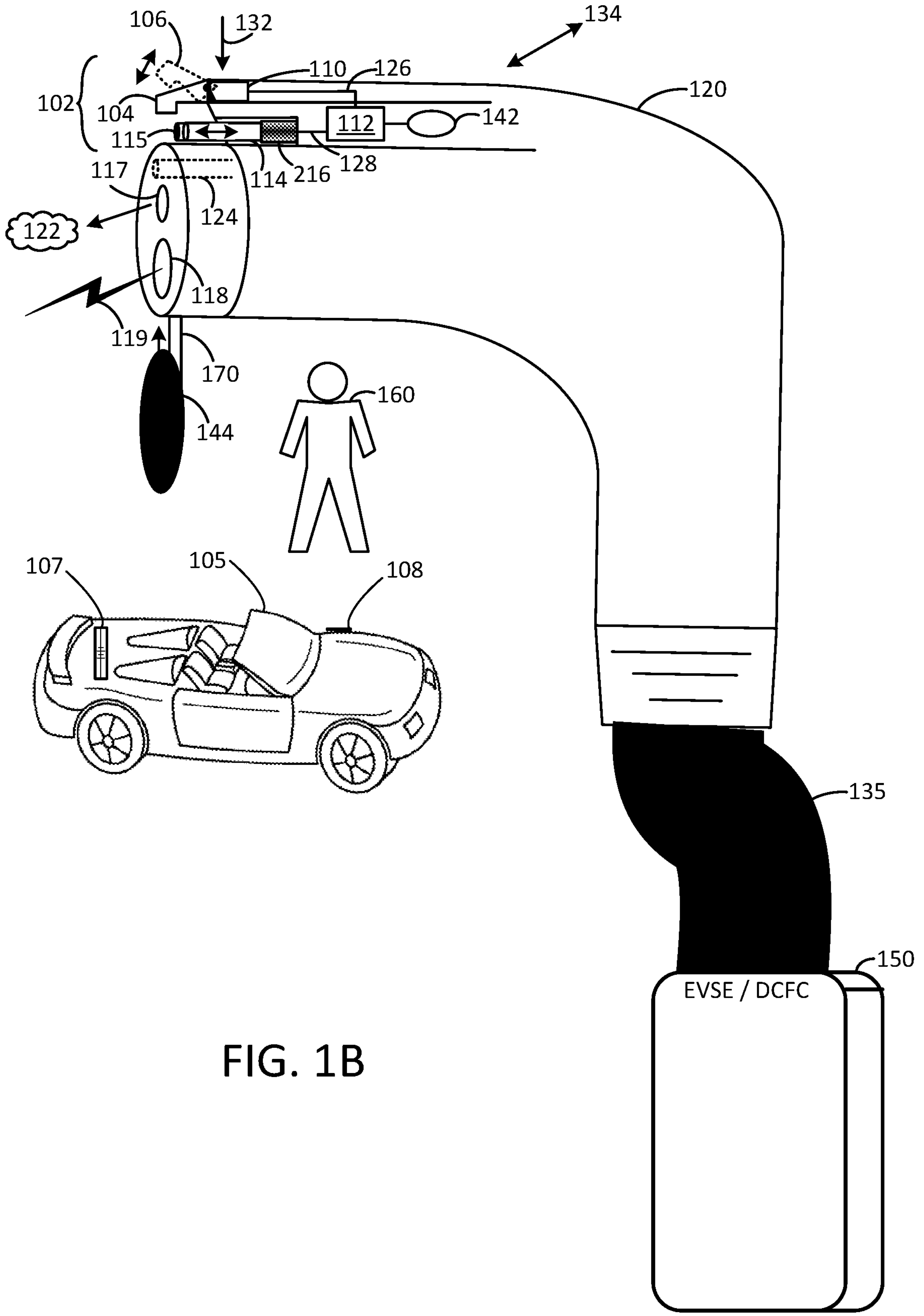
FIG. 1B illustrates another example diagram of an electric vehicle charging handle including a damage and hazard prevention device in accordance with various embodiments of the present invention.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first electric vehicle could be termed a second electric vehicle, and, similarly, a second electric vehicle could be termed a first electric vehicle, without departing from the scope of the inventive concept.

Like numbers refer to like elements throughout. The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference is often made herein to "electric vehicles." It will be understood that such vehicles can include plug-in hybrid vehicles, pure electric vehicles, an electric golf cart, an electric bike, an electric scooter, an electric skateboard, a SEGWAY®, or any one of a variety of vehicles that operate or move using at least some electricity. Such vehicles can also include electric trucks, delivery vans, as well as other systems that include storage batteries including, for example, a trailer of an electric tractor-trailer vehicle, which may contain batteries to be charged even though it is not itself a complete vehicle. The term "control signal" as referred to herein can be a "pilot signal," or other suitable control signal. The term "pilot signal" as referred to herein can be a low voltage connection that is used to control a level of current draw that the electric vehicle requests or is allowed to request.

FIG. 1A illustrates an example diagram of an electric vehicle charging handle 120 including a damage and hazard prevention device 102 in accordance with various embodiments of the present invention. The charging handle 120 can be connected to a charging cable 135, which can be connected to charging equipment 150. The charging equipment 150 can include an EVSE unit, a DCFC, or the like. The charging handle 120 can deliver a charge 119 via port 118 to an electric vehicle 105, and can communicate one or more other charging signals 122 via port 117 to the electric vehicle 105. For example, the port 117 can support a J1772 proximity signal and/or standard signals. The port 117 can support other signals and/or standards such as combined charging system (CCS), Mennekes, CHAdeMO, Tesla®, and/or other suitable signals and/or standards.

The damage and hazard prevention device 102 of the charging handle 120 can include a connector latch assembly 104 and/or ejection element 114. The connector latch assembly 104 can temporarily affix the charging handle 120 to the electric vehicle 105. The connector latch assembly 104 can be caused to be lifted responsive to a mechanical force 132, and disconnected from the electric vehicle 105. For example, the mechanical force 132 can be applied to a section 110 of the charging handle 120. The section 110 can be a button, an actuator, a lever, or the like. The mechanical force 132 applied to the section 110 can be from a human thumb, finger, or the like.

The usual process of disconnecting the charging handle 120 from an electric vehicle 105 can be for the user 160 to apply the mechanical force 132 to the section 110. The mechanical force 132 that is applied to the section 110 can cause the connector latch assembly 104 to be lifted, as shown at 106, and thereafter, the charging handle 120 can be removed from a charging port 108 of the electric vehicle 105. However, an abnormal mechanical force 134 can sometimes be applied to the charging handle 120, such as if the charging handle 120 is pulled in a manner that would result in damage to the electric vehicle 105, the charging handle 120, the cable 135, and/or to the charging equipment 150. Another example of an abnormal mechanical force 134 is if the user 160 of the electric vehicle 105 attempts to drive away while the charging handle 120 is still connected to the electric vehicle 105. Yet other examples of an abnormal mechanical force 134 include the charging handle 120 being sideways impacted, lifted too hard, yanked, or the like. Such abnormal mechanical forces 134 can cause damage to the electric vehicle 105, damage to a battery 107 of the electric vehicle 105, damage to the charging handle 120, damage to the charging cable 135, damage to the charging equipment 150, and/or safety hazards such as electrocution of the user 160.

The mechanical force 132 that is applied to the section 110 can cause the connector latch assembly 104 to be lifted, as shown at 106. Alternatively or in addition, the abnormal mechanical force 134 may be applied to the charging handle 120. Simultaneous with this action (i.e., the normal mechanical force 132 and/or the abnormal mechanical force 134), the ejection element 114 can be caused to automatically move and/or slide in an outward direction so as to mechanically push the charging handle 120 away from the charging port 108 of the electric vehicle 105. In other words, the charging handle 120 can be automatically ejected away from the charging port 108 of the electric vehicle 105 responsive to the mechanical force 132 and/or responsive to the abnormal mechanical force 134. In some embodiments, the ejection element 114 is fully ejected from the charging handle 120 such that it is spaced apart from the charging handle 120 after ejection. In some embodiments, the ejection element 114 is partially ejected from the charging handle 120 such that the ejection element 114 maintains at least some connection to or contact with the charging handle 120 after ejection. In some embodiments, the ejection element 114 can move in a direction that is parallel to the port 117 and/or the port 118 of the charging handle 120, and can automatically, mechanically push the charging handle 120 away from the electric vehicle 105. It will be understood that the ejection element 114 can be located in other areas (e.g., at location 124) associated with the charging handle 120.

In some embodiments, the mechanical force 132 and/or the abnormal mechanical force 134 applied to the charging handle 120 can trigger the ejection element 114, and cause the ejection element 114 to push the charging handle 120 away from the charging port 108 of the electric vehicle 105. For example, the mechanical force 132 applied to the section 110 and/or the abnormal mechanical force 134 can cause a mechanical triggering of a spring 116, which can push the ejection element 114 in an outward direction. In other words, the ejection element 114 can be spring loaded, and can be triggered by the mechanical force 132 being applied to the section 110 of the charging handle 120 and/or by the abnormal mechanical force 134 being applied to the charging handle 120. In some embodiments, the ejection element 114 can include a pad 115 disposed on a terminal end thereof to prevent any damage to electric vehicle 105 during the ejection event.

In an alternative embodiment, the mechanical force 132 applied to the section 110 and/or the abnormal mechanical force 134 applied to the charging handle 120 can cause a signal to be transmitted to and received by a digital logic section 112 via an electric signal line 126. The digital logic section 112 can then transmit a signal via an electric signal line 128, which can cause the spring 116 to push the ejection element 114 in the outward direction. The signal transmitted via the electric signal line 128 can be an ejection signal. In other words, the ejection element 114 can be spring loaded, and can be triggered by an electronic signal coordinated by the digital logic section 112.

The damage and hazard prevention device 102 can further include a sensor 142, which can detect the mechanical abnormal force 134 applied to the charging handle 120 and/or other movement of the charging handle 120. The sensor 142 can be communicatively coupled to the digital logic section 112. The digital logic section 112 and/or the sensor 142 can trigger the ejection of the ejection element 114 responsive to detection of a mechanical force applied to the charging handle 120 and/or responsive to movement of the charging handle 120. The sensor 142 can include an accelerometer, a gyroscope, and/or a magnetometer, or the like.

In some embodiments, the mechanical force 132 applied to the section 110 and/or the abnormal mechanical force 134 applied to the charging handle 120 can cause the signal 122 (e.g., J1172 proximity signal) to indicate to the electric vehicle 105 to terminate charging activity as if the user 160 had pressed (e.g., applied pressure to using a human finger) the section 110 to release the connector latch assembly 104. Accordingly, the chances of causing damage to the electric vehicle 105 can be reduced. In addition, the chances of electrocution to the user 160 can also be reduced.

In some embodiments, at or about the time of the ejection of the charging handle 120, the electrical contacts (e.g., ports 118, 117) of the charging handle 120 can be automatically protected by an insulating material 144 so that any electrical shock hazard from such electrical contacts can be reduced and/or eliminated. Accordingly, the user 160 who may be holding the charging handle during ejection will not be subjected to any electrical shock hazard. The insulating material 144 can be automatically and mechanically moved as to cover the electrical contacts. For example, the insulating material 144 can be slid into place, or flipped into place, or the like. It will be understood that even though the insulating material 144 is shown to be exterior of the charging handle 120, the insulating material 144 can be embedded within the charging handle 120, the port 117, and/or the port 118, for example. A mechanical servo, motor, spring, or the like (e.g., 170), can cause the insulating material 144 to be correctly and automatically positioned at, over, around, attached to, in contact with, and/or near to the electrical contacts of the charging handle 120 at or shortly after the automatic ejection of the charging handle 120 from the electric vehicle 105.

In some embodiments, the charging handle 120 can be reassembled and/or the ejection element 114 reset. In some embodiments, the reassembly and/or the reset of the ejection element 114 can be manually performed by the user 160. In some embodiments, the charging handle 120 can automatically reassemble and/or reset the ejection element 114. In some embodiments, after the damage prevention detection may cause the unit to separate into parts to protect the electric vehicle 105, the charging handle 120 can be reassembled and/or the ejection element 114 reset, either manually or automatically. For example, the spring 116 can be reloaded after the ejection element 114 has been ejected from the charging handle 120. In some embodiments, the spring 116 can be reloaded by the user 160 by pressing the ejection element 114 against the spring 116 to compress the spring 116, and temporarily locking the ejection element 114 into place, for example, using a lock 121. Accordingly, the damage and hazard prevention device 102 can be locked and loaded in place in preparation for the next ejection and separation event, thereby protecting the charge handle 160 and the electric vehicle 105 from unnecessary damage, and also protecting the user 105 from being electrocuted.

FIG. 1B illustrates another example diagram of an electric vehicle charging handle 120 including a damage and hazard prevention device 102 in accordance with various embodiments of the present invention. Some of the elements and associated reference numerals are described in detail above with reference to FIG. 1A, and therefore, a detailed description of such elements is not necessarily repeated. Instead of the spring 116 (of FIG. 1A), an electromechanical device and/or element 216 can cause the ejection element 114 to be pushed in the outward direction. For example, the electromechanical element 216 can be an electromagnet, which can interact with the ejection element 114 such that the ejection element 114 is mechanically and physically pushed in the outward direction. The electromechanical element 216 can be controlled by the digital logic section 112. Alternatively or in addition, the electromechanical element 216 can be directly triggered by the mechanical force 132 being applied to the section 110 of the charging handle 120 and/or by the abnormal mechanical force 134 being applied to the charging handle 120.

The mechanical force 132 that is applied to the section 110 can cause the connector latch assembly 104 to be lifted, as shown at 106. Alternatively or in addition, the abnormal mechanical force 134 may be applied to the charging handle 120. Simultaneous with this action (i.e., the normal mechanical force 132 and/or the abnormal mechanical force 134), the ejection element 114 can be caused to automatically move in an outward direction by the electromechanical element 216 so as to mechanically push the charging handle 120 away from the charging port 108 of the electric vehicle 105. In other words, the charging handle 120 can be automatically ejected away from the charging port 108 of the electric vehicle 105 responsive to the mechanical force 132 and/or responsive to the abnormal mechanical force 134. In some embodiments, the ejection element 114 is fully ejected from the charging handle 120 such that it is spaced apart from the charging handle 120 after ejection. In some embodiments, the ejection element 114 is partially ejected from the charging handle 120 such that the ejection element 114 maintains at least some connection to or contact with the charging handle 120 after ejection. It will be understood that the ejection element 114 can be located in other areas (e.g., at location 124) associated with the charging handle 120.

In some embodiments, the mechanical force 132 and/or the abnormal mechanical force 134 applied to the charging handle 120 can trigger the ejection element 114, and cause the ejection element 114 to push the charging handle 120 away from the charging port 108 of the electric vehicle 105. For example, the mechanical force 132 applied to the section 110 and/or the abnormal mechanical force 134 can cause an electrical triggering of the electromechanical element 216, which can push the ejection element 114 in an outward direction. In other words, the ejection element 114 can be ejected by the electromechanical element 216, and can be triggered by the mechanical force 132 being applied to the section 110 of the charging handle 120 and/or by the abnormal mechanical force 134 being applied to the charging handle 120. In some embodiments, the ejection element 114 can include a pad 115 disposed on a terminal end thereof to prevent any damage to electric vehicle 105.

In an alternative embodiment, the mechanical force 132 applied to the section 110 and/or the abnormal mechanical force 134 applied to the charging handle 120 can cause a signal to be transmitted to and received by a digital logic section 112 via the electric signal line 126. The digital logic section 112 can then transmit a signal via the electric signal line 128, which can cause the electromechanical element 216 to push the ejection element 114 in the outward direction. In other words, the ejection element 114 can be ejected by the electromechanical element 216, and can be triggered by the electronic signal coordinated by the digital logic section 112.

The damage and hazard prevention device 102 can further include the sensor 142, which can detect the mechanical abnormal force 134 applied to the charging handle 120 and/or other movement of the charging handle 120. The sensor 142 can be communicatively coupled to the digital logic section 112, and may trigger the ejection of the ejection element 114 by the electromechanical device 216. The sensor 142 can include an accelerometer, a gyroscope, and/or a magnetometer, or the like.

In some embodiments, the mechanical force 132 applied to the section 110 and/or the abnormal mechanical force 134 applied to the charging handle 120 can cause the signal 122 (e.g., J1172 proximity signal) to indicate to the electric vehicle 105 to terminate charging activity as if the user 160 had pressed the section 110 to release the connector latch assembly 104. Accordingly, the chances of causing damage to the electric vehicle 105 can be reduced. In addition, the chances of electrocution to the user 160 can also be reduced.

In some embodiments, at or about the time of the ejection of the charging handle 120, the electrical contacts (e.g., ports 118, 117) of the charging handle 120 can be automatically protected by the insulating material 144 so that any electrical shock hazard from such electrical contacts can be reduced and/or eliminated. Accordingly, the user 160 who may be holding the charging handle 120 during ejection will not be subjected to any electrical shock hazard. The insulating material 144 can be automatically and mechanically moved as to cover the electrical contacts. For example, the insulating material 144 can be slid into place, or flipped into place, or the like. The mechanical servo, motor, spring, or the like (e.g., 170), can cause the insulating material 144 to be correctly and automatically positioned over the electrical contacts of the charging handle 120 at or shortly after the automatic ejection of the charging handle 120 from the electric vehicle 105.

In some embodiments, the charging handle 120 can be reassembled and/or the ejection element 114 reset. In some embodiments, after the damage prevention detection may cause the unit to separate into parts to protect the electric vehicle 105, the charging handle 120 can be reassembled and/or the ejection element 114 reset. For example, the electromechanical device 216 can be reset after the ejection element 114 has been ejected from the charging handle 120. In some embodiments, the electromechanical device 216 can be reset by the user 160 by inserting and/or attaching the ejection element 114 to the electromechanical element 216, and temporarily locking the ejection element 114 into place, for example, using the electromechanical element 216. Accordingly, the damage and hazard prevention device 102 can be locked and loaded in preparation for the next ejection and separation event, thereby protecting the charge handle 160 and the electric vehicle 105 from unnecessary damage, and also protecting the user 105 from being electrocuted.

Figure 2:
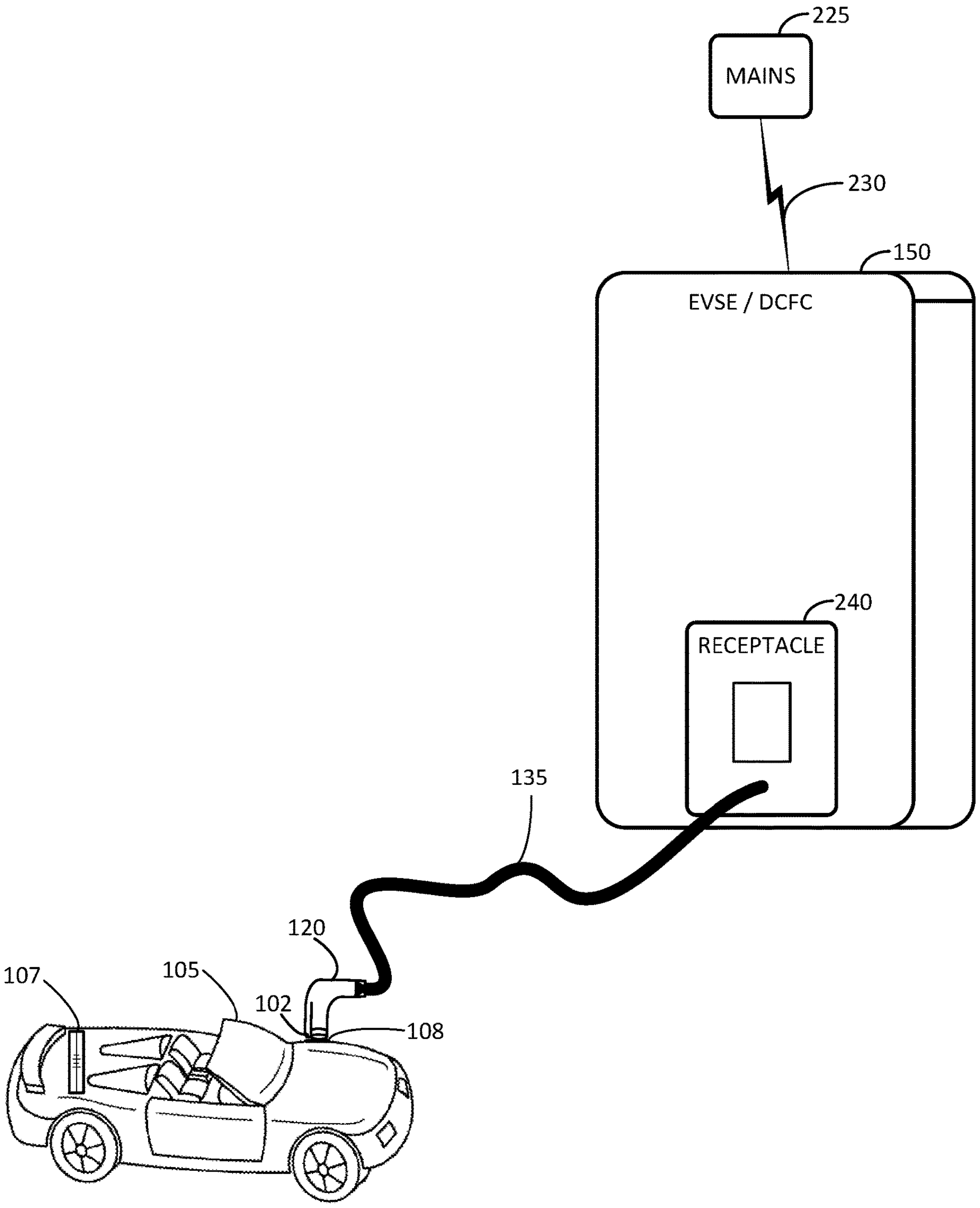
FIG. 2 illustrates an example diagram of an electric vehicle, an EVSE unit, a charging cable, and the charging handle (e.g., of FIG. 1A or 1B) having the damage and hazard prevention device in a connected and charging configuration in accordance with various embodiments of the present invention.

FIG. 2 illustrates an example diagram of the electric vehicle 105, the charging equipment 150 (e.g., EVSE unit, DCFC, etc.), the charging cable 135, and the charging handle 120 (e.g., of FIG. 1A or 1B) having the damage and hazard prevention device 102 in a connected and charging configuration in accordance with various embodiments of the present invention. Some of the elements of FIG. 2 are described above with reference to FIG. 1A or 1B, and therefore, a detailed description of such elements is not necessarily repeated. The charging equipment 150 can be connected to mains 225 via an electric connection 230. The charging equipment 150 can include a receptacle 240 in which the charging handle 120 can be placed between charges of the electric vehicle 105. As shown in FIG. 2, the charging handle 120 is connected to the charging port 108 of the electric vehicle 105, and the electric vehicle 105 is in a charging configuration.

Figure 3:
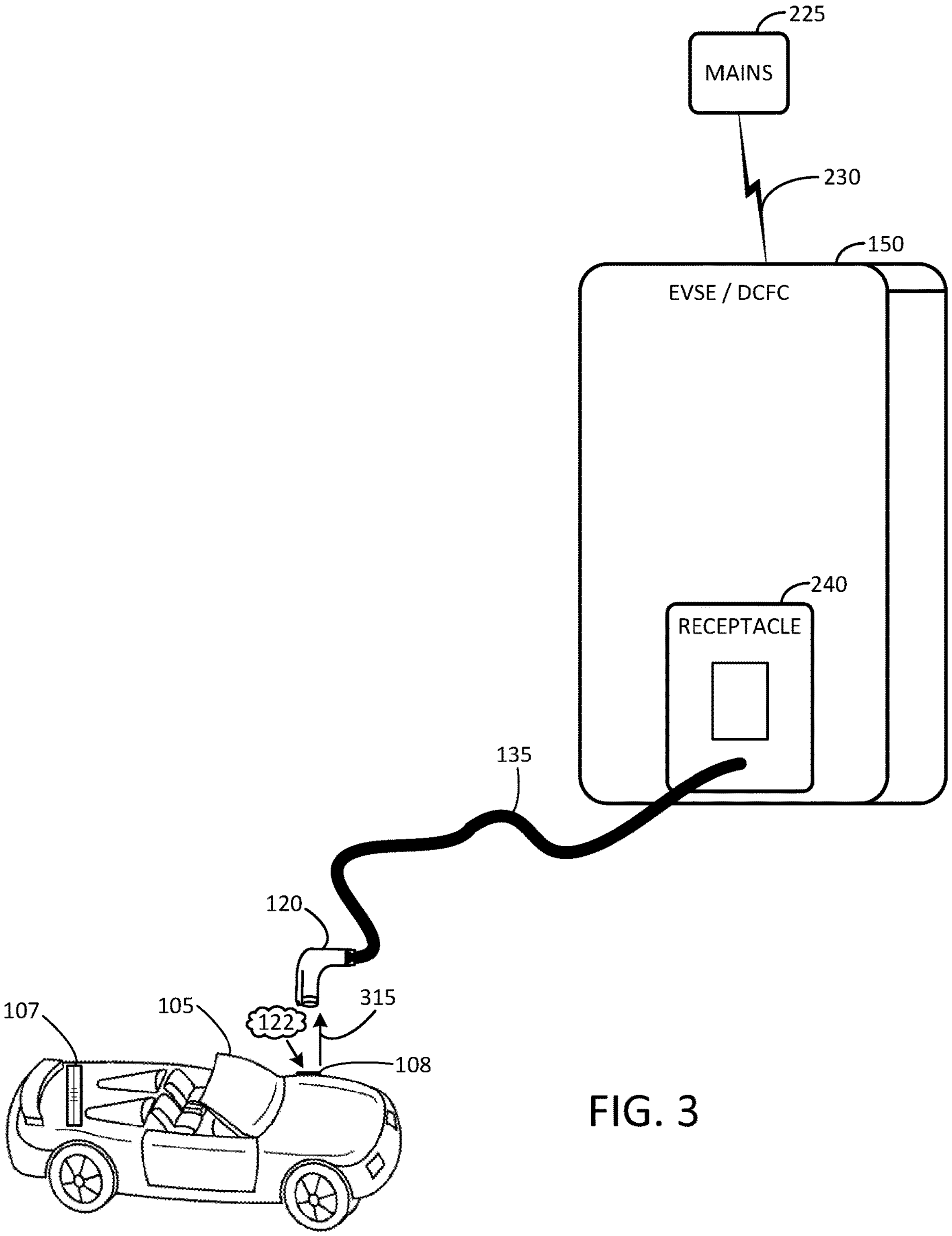
FIG. 3 illustrates the electric vehicle, the EVSE unit, the charging cable, and the charging handle (e.g., of FIG. 1A or 1B) having the damage and hazard prevention device in an automatically disconnected configuration in accordance with various embodiments of the present invention.

FIG. 3 illustrates the electric vehicle 105, the charging equipment 150 (e.g., EVSE unit, DCFC, etc.), the charging cable 135, and the charging handle 120 (e.g., of FIG. 1A or 1B) having the damage and hazard prevention device 102 in an automatically disconnected configuration in accordance with various embodiments of the present invention. Some of the elements of FIG. 3 are described above with reference to FIG. 1A or 1B, and therefore, a detailed description of such elements is not necessarily repeated. Reference is now made to FIGS. 1A, 1B, and 3. As shown in FIG. 3, the charging handle 120 is disconnected from the charging port 108 of the electric vehicle 105, and the electric vehicle 105. The ejection element 114 can cause an ejection force 315 away from the charging port 108 of the electric vehicle 105. At or about the time of ejection, the signal 122 (e.g., J1172 proximity signal) can be sent from the charging equipment 150 to the electric vehicle 105 to indicate to the electric vehicle 105 to terminate charging activity. In some embodiments, the digital logic section 112 of the charging handle 120 can cause the signal 122 to be sent from the charging equipment 150 to the electric vehicle 105 to indicate to the electric vehicle 105 to terminate charging activity.

Figure 4:
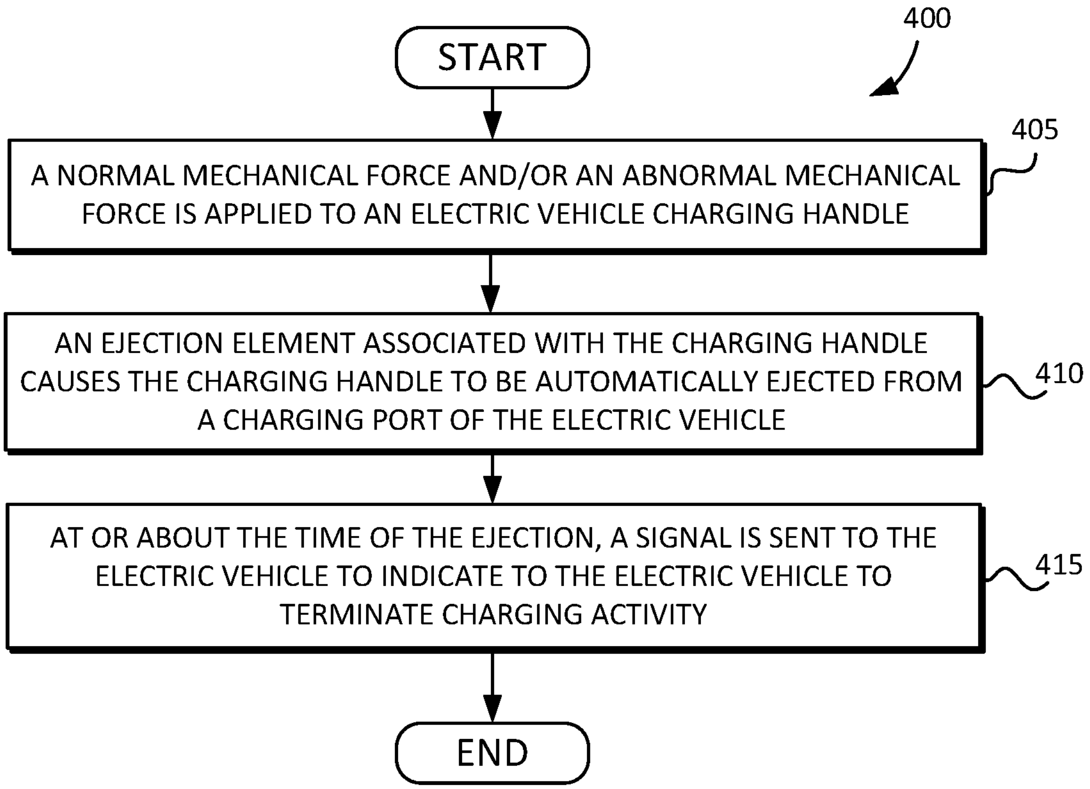
FIG. 4 shows an example flow diagram illustrating a technique for preventing damage and hazards related to electric vehicle charging in accordance with embodiments of the present invention.

FIG. 4 shows a flow diagram 400 illustrating a technique for preventing damage and hazards related to electric vehicle charging in accordance with embodiments of the present invention. Reference is now made to FIGS. 1A, 1B, and 4. At 405, a normal mechanical force 132 and/or an abnormal mechanical force 134 can be applied to a charging handle 120, which can be associated with the electric vehicle 105. At 410, an ejection element 114 associated with the charging handle 120 can cause the charging handle 120 to be automatically ejected from a charging port 108 of the electric vehicle 105. At 415, at or about the time of the ejection, a signal 122 (e.g., J1172 proximity signal) can be sent to the electric vehicle 105 to indicate to the electric vehicle 105 to terminate charging activity. Accordingly, potential damage and hazard are avoided.

Figure 5:
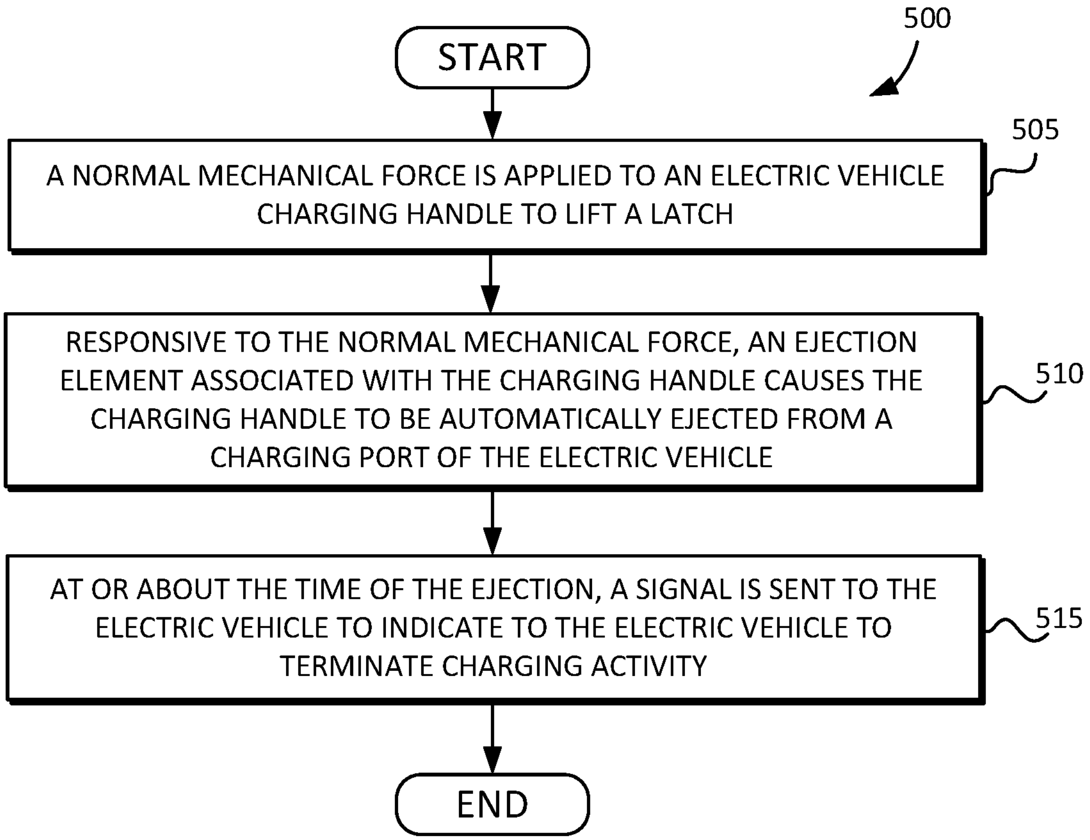
FIG. 5 shows another example flow diagram illustrating a technique for preventing damage and hazards related to electric vehicle charging in accordance with embodiments of the present invention.

FIG. 5 shows another example flow diagram 500 illustrating a technique for preventing damage and hazards related to electric vehicle charging in accordance with embodiments of the present invention. Reference is now made to FIGS. 1A, 1B, and 5. At 505, a normal mechanical force 132 can be applied to a charging handle 120 to lift a latch 104 of the charging handle 120. At 510, responsive to the normal mechanical force 132, the ejection element 114 associated with the charging handle 120 can cause the charging handle 120 to be automatically ejected from the charging port 108 of the electric vehicle 105. At 515, at or about the time of the ejection, the signal 122 (e.g., J1172 proximity signal) can be sent to the electric vehicle 105 to indicate to the electric vehicle 105 to terminate charging activity. Accordingly, potential damage and hazard are avoided.

Some embodiments disclosed herein include a device, comprising an electric vehicle charging handle. The charging handle can include one or more first ports configured to deliver a charge to an electric vehicle. The charging handle can include one or more second ports configured to communicate one or more charging signals to the electric vehicle. The charging handle can include a connector latch assembly configured to temporarily affix the charging handle to the electric vehicle. The charging handle can include an ejection element configured to automatically and mechanically push the charging handle away from the electric vehicle. The charging handle can include a digital logic section configured to transmit an electronic signal via an electric signal line to cause the ejection element to push the charging handle away from the electric vehicle. The charging handle can include a sensor configured to detect at least one of i) a mechanical force applied to the charging handle or ii) movement of the charging handle.

In some embodiments, the sensor is communicatively coupled to the digital logic section, and wherein the digital logic section is further configured to trigger an ejection of the ejection element responsive to the sensor detecting the at least one of i) the mechanical force applied to the charging handle or ii) the movement of the charging handle. In some embodiments, the electric signal line is a first electric signal line. In some embodiments, the electronic signal is a first electronic signal. In some embodiments, the electric vehicle charging handle further comprises a second electric signal line communicatively coupled to the digital logic section and to the connector latch assembly. In some embodiments, the connector latch assembly includes a section that is configured to receive an applied pressure from a human finger. In some embodiments, responsive to receiving the applied pressure from the human finger, the second electric signal line is configured to transmit a second electronic signal from the connector latch assembly to the digital logic section. In some embodiments, responsive to receiving the second electronic signal, the digital logic section is configured to transmit the first electronic signal via the first electric signal line to cause the ejection element to push the charging handle away from the electric vehicle.

In some embodiments, the ejection element is configured to be spring-loaded using the spring, and wherein the spring is configured to cause the ejection element to push the charging handle away from the electric vehicle. The charging handle can include an electromagnetic element, wherein the electromagnetic element is configured to cause the ejection element to push the charging handle away from the electric vehicle. The charging handle can include a pad disposed on a terminal end of the ejection element, wherein the pad is configured to prevent damage to the electric vehicle by the ejection element. The charging handle can include a lock configured to lock the ejection element in place.

In some embodiments, the one or more second ports are configured to transmit a signal to the electric vehicle indicating a termination of charging activity at or about a time associated with the ejection element pushing the charging handle away from the electric vehicle. The charging handle can include insulating material configured to be automatically moved into position at least one of i) near to or ii) in contact with at least one of i) the one or more first ports or ii) the one or more second ports at or about a time associated with the ejection element pushing the charging handle away from the electric vehicle.

In some embodiments, the ejection element is configured to be manually reset after the ejection element pushes the charging handle away from the electric vehicle. In some embodiments, the ejection element is configured to be automatically reset after the ejection element pushes the charging handle away from the electric vehicle.

Some embodiments disclosed herein include a method for preventing damage and hazard related to electric vehicle charging. The method can include delivering a charge, by one or more first ports of an electric vehicle charging handle, to an electric vehicle. The method can include communicating, by one or more second ports of the charging handle, one or more charging signals to the electric vehicle. The method can include temporarily affixing, by a connector latch assembly of the charging handle, the charging handle to the electric vehicle. The method can include automatically and mechanically pushing, by an ejection element of the charging handle, the charging handle away from the electric vehicle.

The method can include transmitting, by a digital logic section of the charging handle, an electronic signal via an electric signal line. The method can include causing the ejection element to push the charging handle away from the electric vehicle. The method can include detecting, by a sensor of the charging handle, at least one of i) a mechanical force applied to the charging handle or ii) movement of the charging handle. The method can include triggering an ejection of the ejection element responsive to the sensor detecting the at least one of i) the mechanical force applied to the charging handle or ii) the movement of the charging handle. The method can include receiving, by a section of the connector latch assembly, an applied pressure from a human finger. The method can include, responsive to receiving the applied pressure from the human finger, transmitting, by the second electric signal line, a second electronic signal from the connector latch assembly to the digital logic section. The method can include, responsive to receiving the second electronic signal, transmitting, by the digital logic section, the first electronic signal via the first electric signal line. The method can include, responsive to transmitting the first electronic signal, causing the ejection element to push the charging handle away from the electric vehicle.

In some embodiments, the method can include transmitting, by the one or more second ports, a signal to the electric vehicle indicating a termination of charging activity at or about a time associated with the ejection element pushing the charging handle away from the electric vehicle. The method can include automatically moving into position insulating material at least one of i) near to or ii) in contact with at least one of i) the one or more first ports or ii) the one or more second ports at or about a time associated with the ejection element pushing the charging handle away from the electric vehicle.

The following discussion is intended to provide a brief, general description of a suitable machine or machines in which certain aspects of the invention can be implemented. Typically, the mechanical device(s), machine, or machines can include a system bus to which is attached processors, memory, e.g., random access memory (RAM), read-only memory (ROM), or other state preserving medium, storage devices and units, a video interface, and input/output interface ports. The mechanical device(s), machine, or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The mechanical device(s), machine, or machines can include embedded controllers, such as programmable or non-programmable logic devices or arrays, Application Specific Integrated Circuits (ASICs), embedded computers, smart cards, and the like. The mechanical device(s), machine, or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A device, comprising:

an electric vehicle charging handle, including:

one or more first ports configured to deliver a charge to an electric vehicle;

one or more second ports configured to communicate one or more charging signals to the electric vehicle;

a connector latch assembly configured to temporarily affix the charging handle to the electric vehicle;

an ejection element configured to automatically and mechanically push the charging handle away from the electric vehicle;

an insulating material coupled to the charging handle;

a mechanical servo coupled to the charging handle; and an accelerometer configured to detect an abnormal mechanical force applied to the charging handle during charging of the electric vehicle, wherein responsive to the detection of the abnormal mechanical force:

the one or more second ports are configured to communicate a proximity signal to the electric vehicle to indicate to the electric vehicle to terminate charging activity as if a user had applied pressure to a section of the connector latch assembly to release the connector latch assembly;

the ejection element is configured to automatically and mechanically push the charging handle away from the electric vehicle; and the mechanical servo is configured to automatically position the insulating material over electrical contacts of the charging handle at or after a time that the ejection element pushes the charging handle away from the electric vehicle.

2. The device of claim 1, further comprising a spring, wherein the ejection element is configured to be spring-loaded using the spring, and wherein the spring is configured to cause the ejection element to push the charging handle away from the electric vehicle.

3. The device of claim 1, further comprising an electromagnetic element, wherein the electromagnetic element is configured to cause the ejection element to push the charging handle away from the electric vehicle.

4. The device of claim 1, further comprising a pad disposed on a terminal end of the ejection element, wherein the pad is configured to prevent damage to the electric vehicle by the ejection element.

5. The device of claim 1, further comprising a lock configured to lock the ejection element in place.

6. The device of claim 1, wherein the one or more second ports are configured to transmit a signal to the electric vehicle indicating a termination of charging activity at or about a time associated with the ejection element pushing the charging handle away from the electric vehicle.

7. The device of claim 1, wherein the insulating material is configured to be automatically moved from a first position that is external to the charging handle to a second position that is external to the charging handle and at least one of i) near to or ii) in contact with at least one of i) the one or more first ports or ii) the one or more second ports at or about a time associated with the ejection element pushing the charging handle away from the electric vehicle.

8. The device of claim 1, wherein the ejection element is configured to be manually reset after the ejection element pushes the charging handle away from the electric vehicle.

9. The device of claim 1, wherein the ejection element is configured to be automatically reset after the ejection element pushes the charging handle away from the electric vehicle.

10. The device of claim 1, further comprising a digital logic section configured to transmit an electronic signal via an electric signal line to cause the ejection element to push the charging handle away from the electric vehicle.

11. The device of claim 10, wherein:

the electric signal line is a first electric signal line;

the electronic signal is a first electronic signal;

the electric vehicle charging handle further comprises a second electric signal line communicatively coupled to the digital logic section and to the connector latch assembly;

the connector latch assembly includes a section that is configured to receive an applied pressure from a human finger;

responsive to receiving the applied pressure from the human finger, the second electric signal line is configured to transmit a second electronic signal from the connector latch assembly to the digital logic section; and responsive to receiving the second electronic signal, the digital logic section is configured to transmit the first electronic signal via the first electric signal line to cause the ejection element to push the charging handle away from the electric vehicle.

12. The device of claim 10, wherein the accelerometer is configured to detect movement of the charging handle during charging of the electric vehicle, and wherein responsive to the detection of the movement:

the one or more second ports are configured to communicate the proximity signal to the electric vehicle to indicate to the electric vehicle to terminate charging activity as if the user had applied pressure to the section of the connector latch assembly to release the connector latch assembly;

the ejection element is configured to automatically and mechanically push the charging handle away from the electric vehicle; and the mechanical servo is configured to automatically position the insulating material over electrical contacts of the charging handle at or after the time that the ejection element pushes the charging handle away from the electric vehicle.

13. The device of claim 12, wherein the accelerometer is communicatively coupled to the digital logic section, and wherein the digital logic section is further configured to trigger an ejection of the ejection element responsive to the accelerometer detecting at least one of i) the abnormal mechanical force applied to the charging handle during charging of the electric vehicle or ii) the movement of the charging handle during charging of the electric vehicle.

14. A method for preventing damage and hazard related to electric vehicle charging, the method comprising:

delivering a charge, by one or more first ports of an electric vehicle charging handle, to an electric vehicle;

communicating, by one or more second ports of the charging handle, one or more charging signals to the electric vehicle;

temporarily affixing, by a connector latch assembly of the charging handle, the charging handle to the electric vehicle;

automatically and mechanically pushing, by an ejection element of the charging handle, the charging handle away from the electric vehicle;

detecting, by an accelerometer, an abnormal mechanical force applied to the charging handle during charging of the electric vehicle;

responsive to detecting the abnormal mechanical force:

communicating, by the one or more second ports, a proximity signal to the electric vehicle to indicate to the electric vehicle to terminate charging activity as if a user had applied pressure to a section of the connector latch assembly to release the connector latch assembly;

automatically and mechanically pushing, by the ejection element, the charging handle away from the electric vehicle; and automatically positioning, by a mechanical servo, insulating material over electrical contacts of the charging handle at or after a time that the ejection element pushes the charging handle away from the electric vehicle;

reloading a spring of the ejection element responsive to the user manually pressing the ejection element against the spring to compress the spring; and temporarily locking the ejection element into place using a lock.

15. The method of claim 14, further comprising:

transmitting, by the one or more second ports, a signal to the electric vehicle indicating a termination of charging activity at or about a time associated with the ejection element pushing the charging handle away from the electric vehicle.

16. The method of claim 14, further comprising:

automatically moving the insulating material from a first position that is external to the charging handle to a second position that is external to the charging handle and at least one of i) near to or ii) in contact with at least one of i) the one or more first ports or ii) the one or more second ports at or about a time associated with the ejection element pushing the charging handle away from the electric vehicle.

17. The method of claim 14, further comprising:

transmitting, by a digital logic section of the charging handle, an electronic signal via an electric signal line.

18. The method of claim 15, wherein:

the electric signal line is a first electric signal line;

the electronic signal is a first electronic signal;

the electric vehicle charging handle includes a second electric signal line communicatively coupled to the digital logic section and to the connector latch assembly;

the method further comprises:

receiving, by a section of the connector latch assembly, an applied pressure from a human finger;

responsive to receiving the applied pressure from the human finger, transmitting, by the second electric signal line, a second electronic signal from the connector latch assembly to the digital logic section;

responsive to receiving the second electronic signal, transmitting, by the digital logic section, the first electronic signal via the first electric signal line; and responsive to transmitting the first electronic signal, causing the ejection element to push the charging handle away from the electric vehicle.

19. The method of claim 17, further comprising:

detecting, by a sensor of the charging handle, at least one of i) a mechanical force applied to the charging handle or ii) movement of the charging handle.

20. The method of claim 19, further comprising:

triggering an ejection of the ejection element responsive to the sensor detecting the at least one of i) the mechanical force applied to the charging handle or ii) the movement of the charging handle.

* * * * *